US010987817B2

(12) United States Patent
Bayer et al.

(10) Patent No.: US 10,987,817 B2
(45) Date of Patent: Apr. 27, 2021

(54) INDUSTRIAL ROBOT WITH A WEIGHT COUNTERBALANCE SYSTEM

(75) Inventors: Albert Bayer, Augsburg (DE); Gunther Merk, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 2893 days.

(21) Appl. No.: 12/893,466

(22) Filed: Sep. 29, 2010

(65) Prior Publication Data

US 2011/0072930 A1 Mar. 31, 2011

(30) Foreign Application Priority Data

Sep. 29, 2009 (DE) .................. 10 2009 043 405.4

(51) Int. Cl.
*B25J 19/00* (2006.01)
(52) U.S. Cl.
CPC ..... *B25J 19/0012* (2013.01); *Y10T 74/20305* (2015.01)
(58) Field of Classification Search
CPC ... B25J 19/0012; B25J 19/0016; B25J 19/002
USPC .............. 74/490.01, 490.03, 490.05; 901/49
See application file for complete search history.

(56) References Cited

U.S. PATENT DOCUMENTS

| | | | | |
|---|---|---|---|---|
| 4,466,307 A * | 8/1984 | Kouno | ................ | B25J 9/046 414/1 |
| 4,592,697 A * | 6/1986 | Tuda | ................ | B25J 9/046 267/71 |
| 4,904,150 A * | 2/1990 | Svensson | ............ | B25J 19/0012 188/382 |
| 5,245,885 A * | 9/1993 | Robertson | ........... | B25J 15/0009 294/119.3 |
| 6,408,225 B1 * | 6/2002 | Ortmeier | .............. | B25J 19/0012 192/58.62 |
| 6,848,333 B2 * | 2/2005 | Lundstrom | .......... | B25J 19/0016 74/490.05 |
| 6,962,220 B2 * | 11/2005 | Takenaka | ............. | B25J 19/0008 180/8.1 |
| 7,202,442 B2 * | 4/2007 | Nakagiri | .............. | B25J 19/0029 219/125.1 |
| 7,719,222 B2 * | 5/2010 | Theobald | ................ | B25J 5/005 318/568.11 |
| 7,806,019 B2 * | 10/2010 | Iwai | ..................... | B25J 19/0025 414/918 |

(Continued)

FOREIGN PATENT DOCUMENTS

| | | | | |
|---|---|---|---|---|
| CA | 2217722 | * | 4/1996 | ............. B25J 19/00 |
| DE | 229 952 A1 | | 11/1985 | |

(Continued)

OTHER PUBLICATIONS http://www.hansa-flex.ca/downloads/HKO-Katalog-2006_eng.pdf. *

German Patent Office; Office Action in German Patent Application No. 10 2009 043 405A dated Jul. 13, 2010; 3 pages.

*Primary Examiner* — Zakaria Elahmadi
(74) *Attorney, Agent, or Firm* — Dorton & Willis, LLP

(57) ABSTRACT

The invention relates to an industrial robot (1) having a robot arm (2) with a plurality of axes (9, 10) designed for a high payload and having a weight equalization system (12) based on gas for at least one of the axes (9), whose pressurized components (13-15) each have a volume of less than 1 liter and a maximum pressure of less than 1000 bar.

9 Claims, 2 Drawing Sheets

(56) References Cited

U.S. PATENT DOCUMENTS

Figure 1:
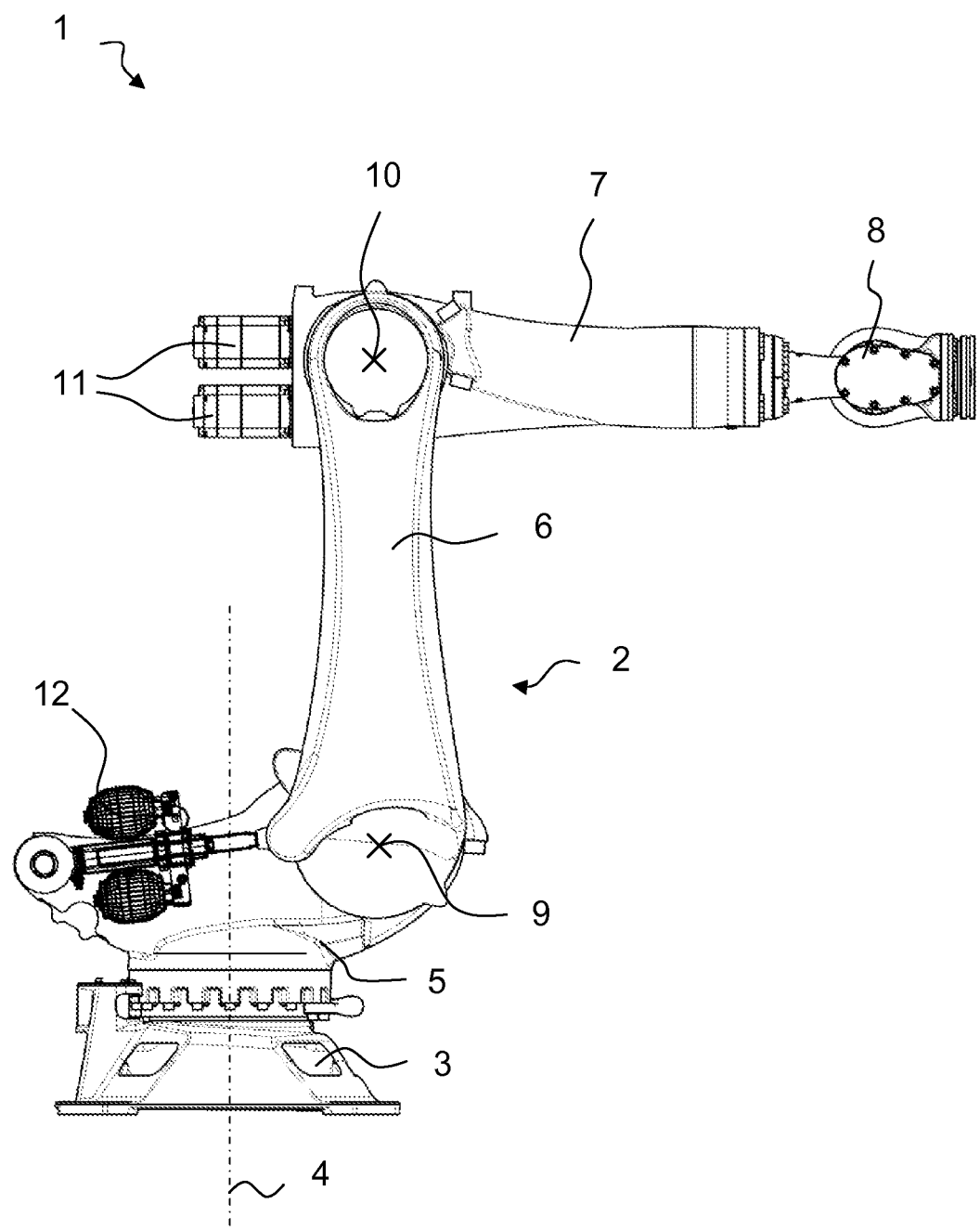

| | | | | |
|---|---|---|---|---|
| 2001/0025541 | A1* | 10/2001 | Bohlken | B25J 9/1075 74/490.01 |
| 2003/0106390 | A1* | 6/2003 | Bohlken | B25J 9/1075 74/490.01 |
| 2007/0265731 | A1* | 11/2007 | Merk | B25J 9/102 700/245 |
| 2008/0069679 | A1* | 3/2008 | Shimada | B25J 9/106 414/744.5 |
| 2009/0314120 | A1* | 12/2009 | Larsson | B25J 19/0029 74/490.02 |
| 2011/0239806 | A1* | 10/2011 | Markert | B25J 19/0016 74/490.01 |
| 2011/0247446 | A1* | 10/2011 | Namoun | F15B 15/1447 74/490.01 |
| 2011/0252912 | A1* | 10/2011 | Nakagiri | B25J 9/1692 74/490.01 |
| 2011/0252921 | A1* | 10/2011 | Nakagiri | B25J 9/104 74/665 R |
| 2012/0011956 | A1* | 1/2012 | Lundberg | B25J 9/04 74/490.03 |
| 2012/0067156 | A1* | 3/2012 | Chen | B25J 9/106 74/490.01 |

FOREIGN PATENT DOCUMENTS

| | | |
|---|---|---|
| DE | 3 817 487 A1 | 12/1988 |
| DE | 39 25 627 A1 | 2/1991 |
| DE | 199 45 189 A1 | 4/2001 |
| DE | 100 15 411 C1 | 7/2001 |
| EP | 0 819 041 A1 | 1/1998 |
| WO | 96/31325 A1 | 10/1996 |
| WO | WO 9631325 A1 * 10/1996 ................ B25J 9/04 |  |

\* cited by examiner

INDUSTRIAL ROBOT WITH A WEIGHT COUNTERBALANCE SYSTEM

The invention relates to an industrial robot having a weight equalization system.

An industrial robot is generally understood to be a manipulating machine which is equipped with useful tools for automatic handling of objects, and is programmable in a plurality of motion axes, in particular with regard to orientation, position and process sequence. Industrial robots include essentially a control apparatus and a robot arm having a plurality of axes, and possibly levers that are moved by drives that actuate the control apparatus [Translator's note: The illogical last clause of the preceding sentence is forced by the choice of verb form ('ansteuern') in the original; it probably should read 'ansteuert,' so that the English will read "drives that are actuated by the control apparatus.].

Industrial robots, in particular industrial robots having a relatively large payload, may have a weight or mass equalization system that includes for example a coil spring for at least one of their axes, in particular for the second axis of the kinematic chain or the axis that lies horizontally.

EP 0 819 041 B1 discloses a multiaxial industrial robot designed for payloads greater than 25 kg, which has a base, a rocker, an extension arm and a robot hand, which are pivot-mounted on each other and are moved by electric drives. The industrial robot has a static hydraulic mass equalization system, which compensates to a large extent during operation for dynamic and static loads acting on the rocker for example due to the payload or the extension arm. The hydraulic mass equalization system has a hydraulic cylinder and a pressure accumulator connected to the hydraulic cylinder. In the pressure accumulator is a gas bubble pre-tensioned under high pressure, which presses on an oil cushion and produces the counterforces to compensate for the loads on the rocker.

Mass equalization systems that work on the basis of pressure, such as gas weight equalization systems or hydropneumatic weight equalization systems, are relatively expensive, however, since they may have to fulfill provisions of law, such as the Pressure Equipment Directive which is in effect in Europe.

The object of the invention is to specify a more economical industrial robot, designed in particular for relatively large payloads, having a weight equalization system based on gas.

The problem of the invention is solved by an industrial robot having a robot arm with a plurality of axes designed for a large payload and having a weight equalization system based on gas for at least one of the axes, whose pressurized components each have a volume of less than 1 liter and a maximum pressure of less than 1000 bar. The industrial robot according to the invention accordingly includes the robot arm having a plurality of axes, preferably having six axes, designed for a relatively high payload. A high payload means in particular a payload of greater than 80 kg, preferably greater than 90 kg.

Depending on the placement or position of the robot arm, it no longer makes sense to apply torques that arise for all axes solely by the drives that move the axes or possibly transmissions assigned to the drives, which is why the robot according to the invention has the weight equalization system. In order to implement this weight equalization system so that it is relatively small and compact, it is based on gas. Such a weight equalization system includes a plurality of components, all of which are under pressure. According to the invention, each of these pressurized components has a volume of less than 1 liter and a maximum pressure of less than 1000 bar. In particular, these components are designed so that the operating pressure is always under 1000 bar, even when the industrial robot is in extreme positions and at elevated ambient temperatures, and shows a sufficiently great safety margin compared to the bursting pressure of the relevant component.

Because of this design according to the invention of the pressurized components of the weight equalization system of the industrial robot according to the invention, preferably designed as a hydropneumatic weight equalization system, there is assurance that the weight equalization system, and accordingly also the industrial robot according to the invention, will never fall below the pressure container directive in effect in Europe when operated as intended. Thus it may be possible to dispense with expensive testing, documentation or design acceptance of the industrial robot according to the invention or its weight equalization system. In addition, it may be possible to dispense with components of the weight equalization system that would otherwise be necessary, such as an accumulator safety valve.

Another possible advantage of the industrial robot according to the invention is that it may be significantly easier to route cables on the industrial robot, since the weight equalization system may be of relatively compact construction. This can result in corresponding cost savings due to improved configuration of the cables.

The weight equalization system can have as components at least one pressure accumulator and at least one pressure cylinder that is operatively connected to the pressure accumulator. These components each have according to the invention a maximum volume of one liter and a maximum pressure of less than 1000 bar. The pressure accumulator may keep available the countertorque for the weight equalization and produced by the pressure cylinder, to compensate at least partially, if not indeed largely, for the torque produced by the relevant axis. The pressure cylinder has for example a piston that is movably supported in a housing.

To enable the weight equalization system of the industrial robot according to the invention to keep sufficient pressure in reserve if necessary, the pressure equalization system can have at least two pressure accumulators, which are operatively connected to a single pressure cylinder. The two pressure accumulators and the pressure cylinder each have a maximum volume of one liter and a maximum pressure of less than 1000 bar.

In order to ensure that the pressurized components are always below 1000 bar when the industrial robot according to the invention is operated as intended, the pressurized components are preferably designed so that their respective maximum pressures are significantly lower than 1000 bar. The respective maximum pressures are in particular 400 bar maximum, in particular 350 bar maximum and preferably 300 bar maximum.

According to one embodiment of the industrial robot according to the invention, the robot arm has a carousel and a rocker, with the axis assigned to the weight equalization system being assigned to the rocker. The axis assigned to the rocker is sometimes also referred to as axis 2, and may be subjected to the greatest torque, for which reason the weight equalization system is assigned to this axis according to this embodiment. Because of the dimensioning of the weight equalization system according to the invention, this system can be designed relatively compactly, so that the design of the components adjacent to the weight equalization system, such as the carousel and the rocker in particular, can be improved.

Because of the dimensioning of the pressurized components of the weight compensation system according to the invention, it is possible to design this system relatively compactly, as explained earlier. That makes it possible to situate the point of support of the weight equalization system significantly closer to the line of application of the equalization force to be exerted. As a result it is possible, according to one variant of the industrial robot according to the invention, to get by with only one point of support, in particular a relatively compact one. In particular, the weight equalization system can be supported on the carousel using a single bearing. Eliminating a second point of support saves not only the bearing itself, but also the surrounding structure. In addition to the saving of material, this also makes it possible to produce the carousel more simply; it may be possible to use smaller and hence more economical manufacturing facilities.

In addition, it may be permissible to design the rocker more freely and hence more economically, making it possible for example to save material.

The weight equalization system of the industrial robot according to the invention thus may be designed so that the operating pressure in extreme positions and at elevated ambient temperatures is still below the permissible operating pressure and has a sufficiently great safety factor relative to the bursting pressure. During filling of the relevant components the filling pressures may be monitored and recorded, so that it is possible to prevent a weight compensation system from being operated with erroneous parameters and the safety factors from no longer being adequate. In particular, during filling the filling pressures are limited by a limiting means such as a pressurized rupture disk, to ensure that a given limit of the filling pressures is maintained. Savings are also possible for a buyer or operator of the industrial robot according to the invention, for example because acceptances (initial start-up, recurring testing) are not needed.

In particular when a hydropneumatic system is used as the weight equalization system, saving can also result for the industrial robot according to the invention, since this may enable a more economical design of the entire area around the relevant axis, possibly around axis 2.

An example of an exemplary embodiment of the invention is depicted in the attached schematic drawings. The figures show the following:

FIG. 1 an industrial robot having a weight equalization system, and

Figure 2:
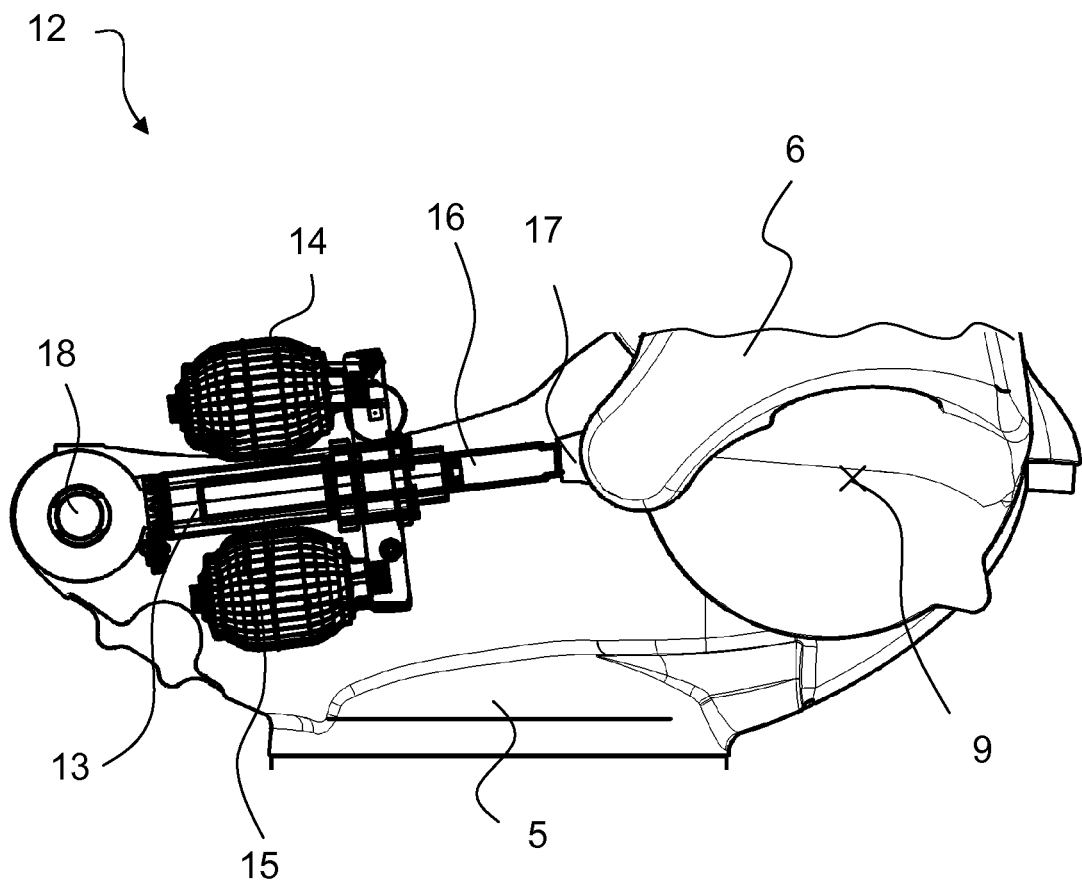

FIG. 2 the weight equalization system.

FIG. 1 shows a side view of an industrial robot 1 having a robot arm 2 which is designed for large payloads, in particular greater than 90 kg.

In the case of the present exemplary embodiment, robot arm 2 includes a stationary or movable base 3 und a carousel 5 that is supported so that it is rotatable relative to base 3 around a vertical axis 4, which is also referred to as axis 1. In the case of the present exemplary embodiment, robot arm 2 of industrial robot 1 also has a rocker 6, an extension arm 7 and a preferably multiaxial robot hand 8. Rocker 6 is mounted at the lower end on carousel 5, for example on a swivel bearing head that is not shown in further detail, so that it can swivel around a preferably horizontal axis 9, which is also referred to as axis 2. At the upper end of rocker 6, extension arm 7 in turn is mounted so that it can swivel around a likewise preferably horizontal axis 10. This extension arm carries at its end robot hand 8 with its preferably three axes, which are not shown in further detail in FIG. 1.

In order to move industrial robot 1 or its robot arm 2, the latter includes drives, in particular electric drives, that are connected in a generally known way to a control device 10, which is not shown in further detail. Only some of the electric motors 11 of these drives are shown in FIG. 1.

The dynamic and/or static loads that act on rocker 6 during operation of industrial robot 1 due to the payload, the extension arm 6 [Translator's note: This should apparently be 7 rather than 6.], etc., are at least largely compensated for in the case of the present exemplary embodiment by a weight equalization system 12 based on gas which is shown in greater detail in FIG. 2. Weight equalization system 12 is in particular a gas weight equalization system, or a hydropneumatic weight equalization system, as is the case in the present exemplary embodiment.

In the case of the present exemplary embodiment, weight equalization system 12 has a hydraulic cylinder 13 and two pressure accumulators 14, 15 which are connected to hydraulic cylinder 13. Pressure accumulators 14, 15 are fastened for example to hydraulic cylinder 13, and are connected to the latter by a connecting line.

In each of pressure accumulators 14, 15 is a pre-pressurized gas bubble, not shown in greater detail, which presses for example on an oil cushion and produces the counter-forces to compensate for the loads on the rocker. The pressure of each of the two pressure accumulators 14, 15 is chosen so that there are always lower than 400 bar, in particular lower than 350 bar and preferably lower than 300 bar, even at extreme positions of robot arm 2 and at elevated ambient temperatures. Furthermore, the two pressure accumulators 14, 15 are designed so that their volumes which are provided for the respective gas bubble are smaller than 1 liter.

In the case of the present exemplary embodiment, hydraulic cylinder 13 has a piston 16 which is rotatably linked to rocker 6, for example through a bearing eye 17. Hydraulic cylinder 13 in turn is supported at its back end on the rear edge of carousel 5 by means of a single pivot bearing 18.

Hydraulic cylinder 13 is thus attached to carousel 5 and through its piston 16 to rocker 6 in such a way that piston 16 is able to follow swivel motions of rocker 6 around the latter's axis 9. For example, when rocker 6 swivels downward it extends, and while so doing it pumps hydraulic oil into pressure accumulators 14, 15, which compresses the relevant gas bubbles. The springing reactive force of the gas bubbles reacts on piston 16 and, when the pretensioning of the gas bubbles is appropriately tuned, compensates for the forces and moments acting from outside on rocker 6.

In the case of the present exemplary embodiment, hydraulic cylinder 13 is constructed so that it has a volume of less than 1 liter. Hydraulic cylinder 13 is also designed so that the pressure of hydraulic cylinder 13 is always less than 400 bar, in particular less than 350 bar and preferably less than 300 bar, even at extreme positions of robot arm 2 and at elevated ambient temperatures.

This ensures that all pressurized components of weight equalization system 12, i.e., in particular the two pressure accumulators 14, 15 and hydraulic cylinder 13, always have a volume of less than 1 liter and a maximum pressure of significantly less than 1000 bar.

The invention claimed is:

1. An industrial robot, comprising:
    a robot arm having a plurality of articulation axes; and
    a pressurized gas-based weight equalization system operatively coupled with the robot arm, the weight equalization system comprising pressurizable components and operable to react to forces applied to the robot arm for offsetting a load supported thereon:

the pressurizable components each having a volume capacity less than 1 liter (61.0 cubic inches), and a maximum pressure capacity less than 1000 bar (14.5 kpsi);

wherein the weight equalization system comprises:

a pressure cylinder; and at least two pressure accumulators, each operatively coupled with the pressure cylinder.

2. The industrial robot of claim 1, wherein the pressurizable components have a maximum pressure capacity of 400 bar (5.80 kpsi).

3. The industrial robot of claim 1, wherein the pressurizable components have a maximum pressure capacity of 350 bar (5.08 kpsi).

4. The industrial robot of claim 1, wherein the pressurizable components have a maximum pressure capacity of 300 bar (4.35 kpsi).

5. The industrial robot of claim 1, wherein the robot arm comprises:

a carousel; and a rocker supported on the carousel and having a pivot axis about which the rocker moves;

wherein the weight equalization system reacts to forces applied to the rocker in response to movement of the rocker about the pivot axis.

6. The industrial robot of claim 5, wherein the weight equalization system is supported on the carousel by a single bearing.

7. The industrial robot of claim 5, wherein the weight equalization system is one of a gas system that uses only pressurized gas as the working fluid, or a hydropneumatic system that uses gas and liquid as the working fluid.

8. The industrial robot of claim 1, wherein the robot arm has a maximum payload capacity greater than 80 kg (176.4 pounds).

9. The industrial robot of claim 1, wherein the robot arm has a maximum payload capacity greater than 90 kg (198.4 pounds).

* * * * *